United States Patent [19]

Selinko

[11] 3,917,372

[45] Nov. 4, 1975

[54] SUPPORTING AND CONNECTING STRUCTURE FOR ELECTRIC DEVICE

[75] Inventor: George J. Selinko, Lighthouse Point, Fla.

[73] Assignee: Motorola, Inc., Chicago, Ill.

[22] Filed: Oct. 3, 1974

[21] Appl. No.: 511,545

[52] U.S. Cl.......... 339/75 M; 179/100.11; 325/356; 325/361; 339/91 R

[51] Int. Cl.².................... H04B 1/034; H01R 13/62

[58] Field of Search...................... 339/75, 10, 91 R; 200/51.09; 179/100.11; 317/101 R; 312/7 R; 325/312, 352, 353, 356, 361

[56] References Cited

UNITED STATES PATENTS

| | | | |
|---|---|---|---|
| 3,134,945 | 5/1964 | Wertheimer | 325/312 |
| 3,644,873 | 2/1972 | Dalton et al. | 339/79 |

*Primary Examiner*—Roy Lake
*Assistant Examiner*—Neil Abrams
*Attorney, Agent, or Firm*—Donald B. Southard; James W. Gillman

[57] ABSTRACT

A structure for supporting a portable electric device and for making electrical connections thereto for energizing the device and connecting the same to external apparatus. The structure shown is particularly adapted to support a portable radio for use in a vehicle, and for automatically connecting the radio to an electric current supply and/or an antenna, and/or to other external apparatus. The structure can also be used to lock the radio into the frame, protecting it against unauthorized removal. The supporting structure includes a housing for receiving the electric device, which is slidably mounted in a frame, with movement of the housing causing movement of connectors thereon into operative engagement with electrical connectors on the device. The frame may include a cam engaged by the actuator of a connector, to move the connector as the housing slides within the frame. The structure for supporting a portable radio may include first and second connectors moving in sequence as the housing with the radio therein slides within the frame, with the first connector making electrical connections to the radio and also accurately positioning the radio within the housing, and the second connector then moving to make connection with the radio.

18 Claims, 8 Drawing Figures

SUPPORTING AND CONNECTING STRUCTURE FOR ELECTRIC DEVICE

BACKGROUND OF THE INVENTION

There are many applications in which it is desirable to use a portable device, such as a portable radio, in a mobile or fixed location. When so used, it is desired to connect the device to the power supply of a vehicle or a fixed power supply, so that the charge of a self-contained battery will be retained and the device will be available for portable use. It may also be desired to make other connections to the device, such as an antenna connection to a portable radio. This is important since the antenna in a portable radio may not be effective when the radio is used inside a vehicle or a building. It may be desired to provide a plurality of connections to the device, some of which may require relative fragile connectors, and also to actuate a changeover switch or the like to condition the portable device for operation in the vehicle or fixed location.

Supporting sttructures have been provided for portable electric devices for supporting the same in a vehicle or a housing and for making connections thereto, but such devices have not been entirely satisfactory. Such structures have not had facilities to automatically make connections to external apparatus when the device is positioned in the supporting structure. Devices which have required the making of connections manually have not been of a construction such that the connections are easily accomplished, and this has taken substantial time.

SUMMARY OF THE INVENTION

It is an object of the present invention to provide an improved structure for supporting an electric device and for making electrical connections thereto.

Another object of the invention is to provide a supporting structure for a portable electric device having a connector thereon which operates automatically upon insertion of the device to make electrical connections thereto.

A further object of the invention is to provide security to the supported electric device by making the release operable only through a security lock device.

A still further object of the invention is to provide a structure for supporting a portable electric device which includes a housing portion which moves when the device is positioned therein to cause movement of a connector into engagement with the device for accurately positioning the device in the housing and for making electrical connections thereto.

Still another object of the invention is to provide a converter structure for a portable electrical device which includes a housing for receiving the device which is slidable in a frame, and a connector movable with the housing and cooperating with a cam on the frame to engage the electrical device and make electrical connections thereto and to actuate a switch to convert the device for operation in the converter structure.

Yet another object of the invention is to provide a structure for supporting a portable electric device which has a plurality of electrical connectors, which operate in sequence upon insertion of the device to cause one connector to move to accurately position the device and make connections thereto, and to cause the second connector to engage a connector on the device after the device is accurately positioned in the housing.

In accordance with the invention a structure is provided for supporting a portable radio device to convert the same for use in a vehicle or at a fixed position. A housing is provided for receiving the radio which is movably mounted in a frame. A connector structure is supported on the housing so that as the housing moves in the frame, the connector engages an actuator on the frame to move the connector to engage a mating connector on the radio. The movement of the radio and housing in the frame is in one direction and the movement of the connector is at right angle so that the connector moves into engagement with the side of the radio. The connector has a tapered projection which engages a recess in the side of the radio to accurately position and hold the radio within the housing. The projection has contacts thereon which engage contacts in the sides of the recess for electrically connecting the radio to external apparatus. The projection also engages a pushbutton which operates a switching structure to condition the radio for vehicular or fixed operation. For example, this may disconnect the audio output of the receiver from the speaker in the radio and connect the same to one of the contacts for connection to an external speaker. The connector structure may include a second antenna connector to be inserted into a jack in the radio. This is controlled by the cam structure to be operated after the projection has accurately positioned the radio with respect to the housing to facilitate insertion of the antenna connector and prevent damage thereto. A latch is provided for holding the housing in the position in which the radio is held therein by the connector, and a lock may be coupled to the latch to prevent unauthorized release thereof for removal of the radio.

DETAILED DESCRIPTION

Figure 1:
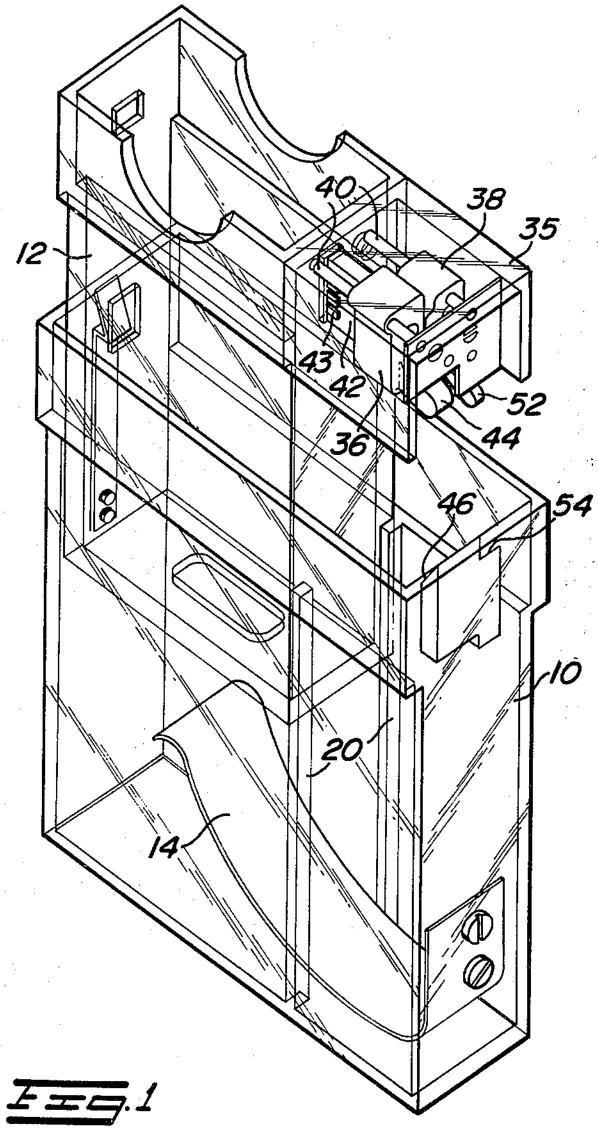
FIG. 1 is a perspective view of the support structure of the invention.

FIG. 1 shows the supporting structure of the invention including a rectangular frame 10 within which a rectangular housing 12 is vertically slidable. A spring 14 secured to the frame 10 bears against the bottom of the housing 12 to urge the same upwardly. A spring clip 16 secured to the frame 10 (FIGS. 2 and 3) has a portion extending through opening 18 in the frame 10 which engages opening 19 in the housing 12 to hold the housing in the lower latched position. The clip 16 is released by moving the end 17 thereof outwardly.

As shown in FIGS. 2, 3, 6 and 8, a lock 11 is secured to the frame 10 which has a sliding bolt 13 adapted to engage the clip 16. When the bolt 13 is extended, it prevents movement of the clip 16 so that the housing 12 cannot move upwardly within the frame 10. The lock 11 can be operated by a key 15 to withdraw the bolt 13, so that the clip 16 can be released by moving the end 17 thereof.

Figure 2:
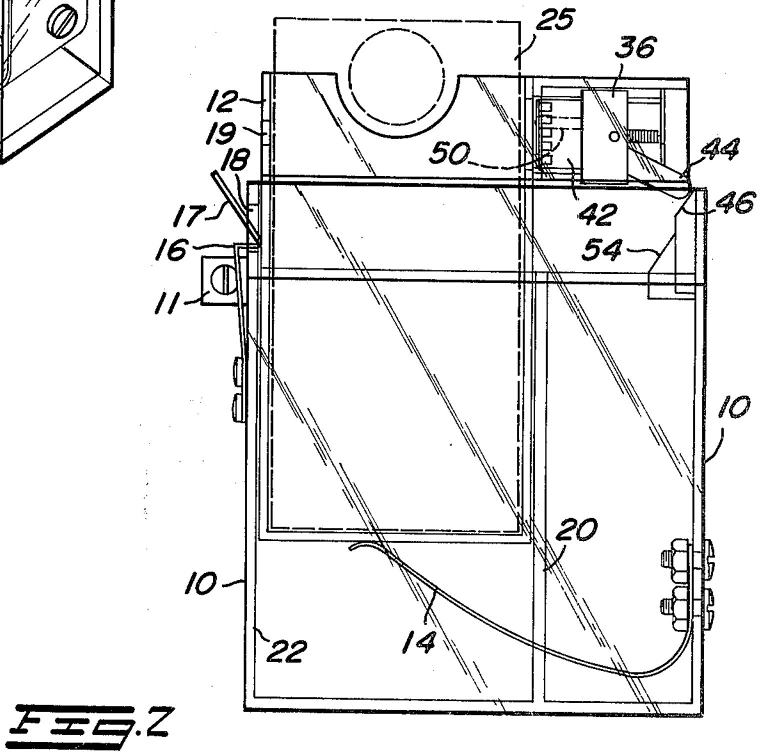
FIG. 2 is a front view of the support structure in the released position.
Figure 3:
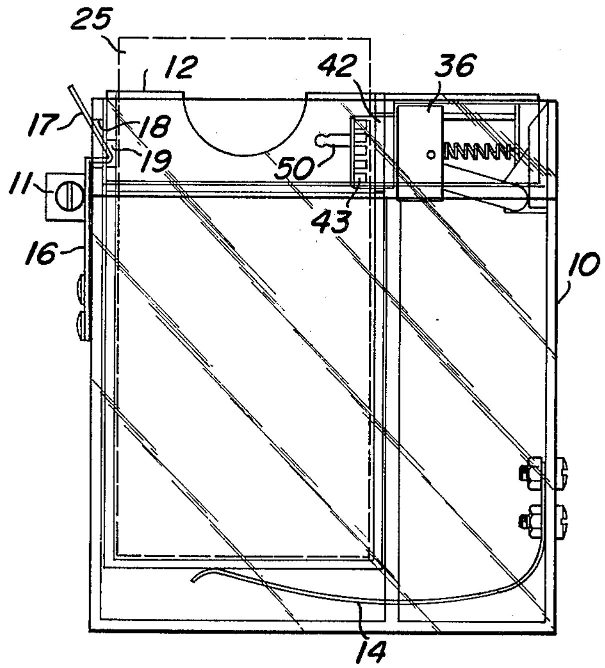
FIG. 3 is a front view of the structure in the latched position.
Figures 7, 8:
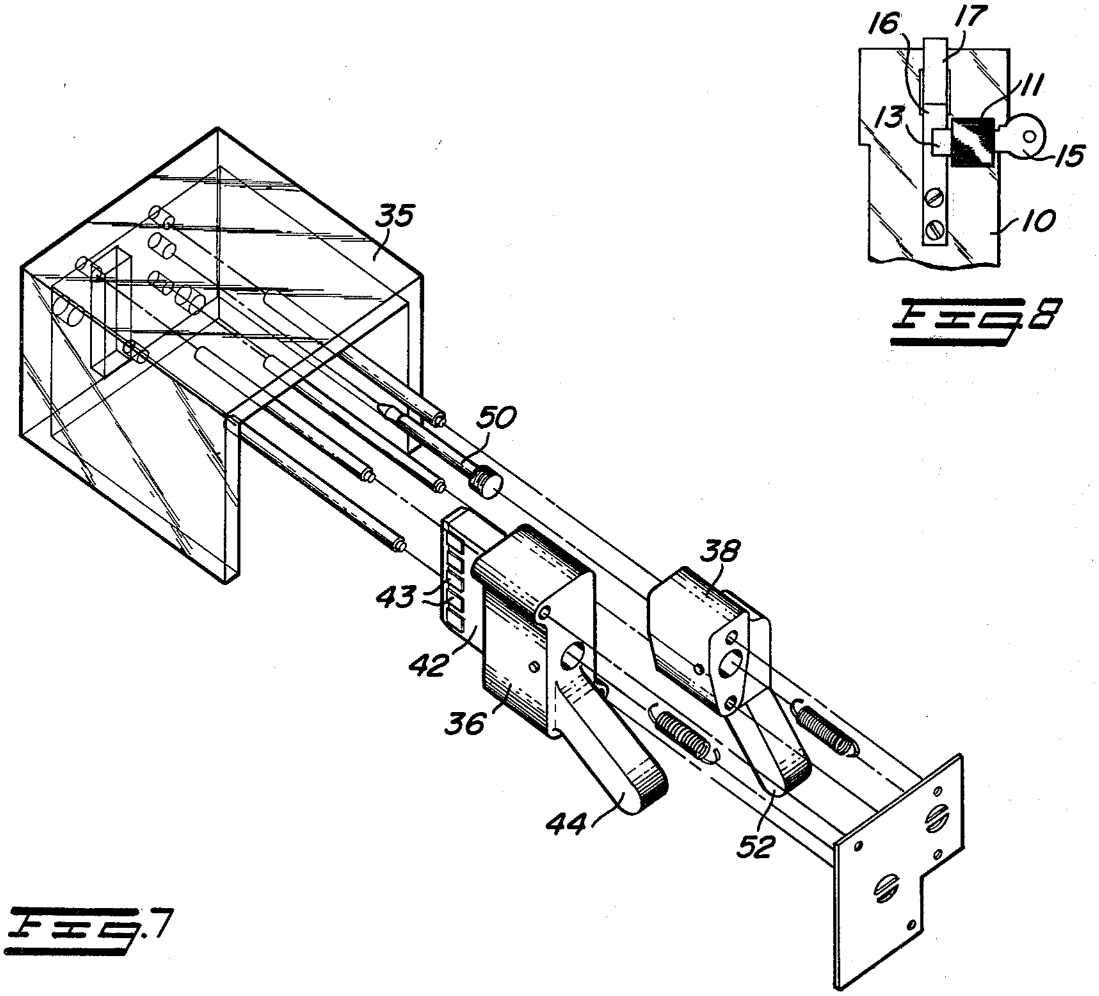
FIG. 7 is an exploded view of the slidable connector structure.
FIG. 8 is a partial side view of the support structure.
Figure 6:
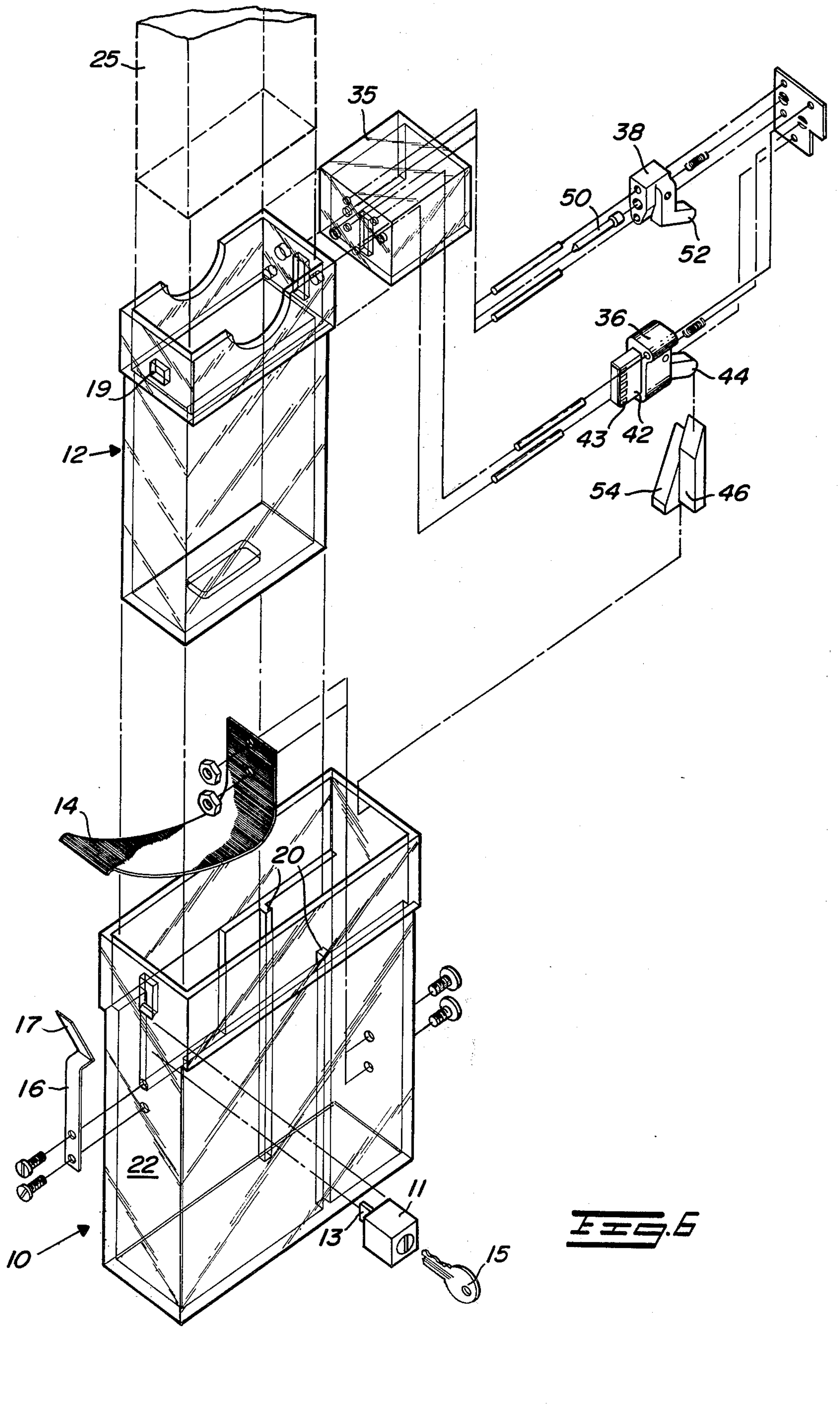
FIG 6 is an exploded view showing one construction of the support structure.

The frame 10 includes ribs 20 which together with the wall 22 (FIG. 2) define a passage within which the housing 12 is slidable. The housing 12 is of a size to receive an electric device 25 such as a radio, shown in dotted lines in FIGS. 2 and 3. The device is placed in the housing with the housing in the upper released position, as shown in FIG. 2. After the device is placed in the housing, the device and housing are moved downward to the lower position, shown in FIG. 3, with the spring clip 16 moving into the opening 19 in the housing 12 to latch the same in the lower actuated position. The lock 11 can be used to prevent release of the spring clip 16 to secure the device from pilferage.

Figure 4:
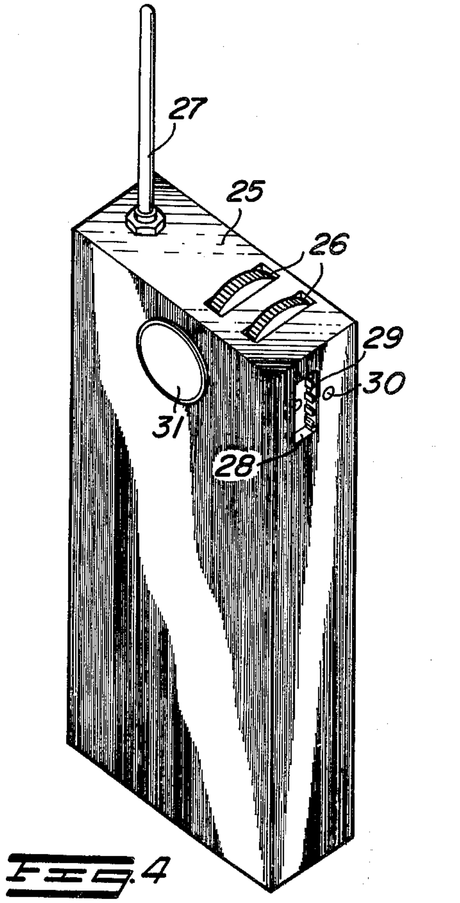
FIG. 4 shows a radio adapted to be supported by the structure of the invention.

FIG. 4 shows a radio device 25 with which the support of the invention is designed to be used. The device is a two-way radio transmitter-receiver adapted to be held in the hand of the user. The radio may have controls 26 on the top and an antenna 27. The radio device includes a recessed connector 28 on the side having a plurality of contacts 29, and an antenna jack connector 30 adapted to receive an antenna plug. A microphone-speaker unit 31 be provided at the front of the radio. To convert the portable radio for use in a vehicle, in a fixed location, it is desired to make a connection to the connector 28 to provide electrical energizing current for the radio. Although a battery is normally contained in the portable radio, this must be frequently charged when it is used, and it is desired to power the radio from an external supply when it is installed in a vehicle or in a fixed location to conserve the battery energy. Also, it may be desired to make a connection from an antenna in the vehicle to the radio, and this is accomplished by connection to the antenna jack 30.

Figure 5:
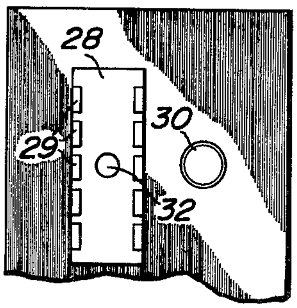
FIG 5 is an enlarged side view of the radio of FIG. 4 showing the connectors therein.

FIG. 5 is an enlarged end view of the upper part of the radio device 25 showing the connectors 28 and 30 in more detail. As stated above, the recessed connector 28 has a plurality of contacts 29 and as shown five connectors are provided on each side which permits the making of ten separate connections. In the bottom of the recess of the connector 28 is a pushbutton 32. When a male connector is inserted in the recessed connector 28 it will engage the pushbutton 32 and move the same inwardly. This can actuate a switch within the radio to operate circuits to convert the radio from self-contained portable operation, to operation as a mobile or fixed radio. For example, the audio output can be switched from a speaker in the radio device to one of the contacts 29 to be applied to an external speaker.

As shown in FIG. 1, an extension 35 is provided on the housing 12 which supports a first movable connector 36 and a second movable connector 38. The connectors are slidable on rods 40 mounted within the extension 35. The connector 36 carries a projection or nose 42 which is adapted to be inserted into the recessed connector 28 of the radio, shown in FIG. 4. The connector 36 is shown in the released position in FIG. 2, wherein the projection 42 is clear of the path of the device 25 when it is inserted in the housing 12. A cam arm 44 is connected to the opposite end of connector 36 and is postioned to engage cam 46 secured to the frame 10. When the housing 12 moves downwardly, the cam arm 44 engages the sliding surface of cam 46 to cause the connector 36 to slide to the left to the position shown in FIG. 3. It is apparent from FIG. 3 that the projection 42 on the connector 36 extends into the radio device 25. This projection includes contacts 43 (see also FIG. 7) which mate with the contacts 29 in the recessed connector 28 of the radio. Further, the projection has tapered sides and fits into the recess of the connector 28 so that the radio device 25 is precisely positioned within the housing 12. The projection 42 engages the pushbutton 32 in the recess of the connector 28 to provide changeover operation in the device 25.

If a separate antenna plug is required the second connector 38 can carry the same, as shown by antenna plug 50. When the housing 12 is in the released position, the antenna plug 50 is clear of the cavity in the housing 12 into which the radio device 25 is inserted. The connector 38 has a cam actuator 52 extending therefrom in the direction opposite to the antenna plug 50, to engage a second cam 54 secured to the frame 10. It will be noted that the cam 54 has its cam surface positioned lower than the surface of the cam 46, so that as the housing 12 slides down, the actuator 52 does not engage the cam 54 until the actuator 44 has engaged cam 46 and moved connector 36 to the left. This results in the connector 36 moving first to move the projection 42 to accurately position the radio device within the housing 12. When the housing 12 moves further down within the frame 10, the cam actuator 52 will engage the cam surface 54 and this will move the connector 36 forward so that the antenna plug 50 is inserted into the antenna jack 30 of the radio device. Cam 54 has a longer cam surface to cause a greater movement of the connector 38 than the movement of connector 36. This provides a long contact area between the plug and jack as is necessary to provide a good high frequency connection for the antenna.

I claim:

1. A supporting and connecting structure for a portable electric device which has an electrical connector thereon, including in combination:

a frame having means defining a passage, a housing movably mounted in said passage of said frame and having a cavity therein for receiving the electric device, said housing having a first released position wherein a part thereof is positioned within said passage and a second operated position wherein a greater part thereof is positioned within said passage, electrical connector means movably supported on said housing and having an actuating arm, said connector means being adapted to couple with the electrical connector of the device, and cam means on said frame positioned to be engaged by said actuating arm of said connector means, said cam means engaging said actuating arm of said connector means as said housing moves from said first position toward said second position to cause said connector means to move to a position to couple with the electrical connector of the device.

2. The structure of claim 1 wherein said housing is slidable in one direction in said passage of said frame means, and said connector means is slidably supported on said housing for movement in a direction at right angles to the direction of movement of said housing.

3. The structure of claim 1 wherein said connector means has a portion thereon which is adapted to engage a connector on the portable device.

4. The structure of claim 2 wherein said portion extends into a recess in the side of the portable device for holding the same in said housing.

5. The structure of claim 4 further including latch means on said frame for holding said housing in said second operated position.

6. The structure of claim 5 further including lock means secured to said frame and coupled to said latch means for preventing release of said latch means to thereby prevent removal of the portable device from said housing.

7. The structure of claim 1 wherein said housing includes support rod means extending substantially at right angles to the direction of movement of said housing in said frame, and said connector means is mounted on said support rod means and said actuating arm thereof engages said cam means to move said connector means along said support rod means.

8. The structure of claim 1 wherein said electrical connector means includes a plurality of portions which move in seqence to couple with the electrical connector of the apparatus.

9. A supporting and connecting structure for a portable radio device which has a recess on one side thereof with electrical connectors therein, including in combination:

a frame having means defining an elongated passage, a housing slidably mounted in said passage of said frame and having a cavity therein for receiving the electric device, said housing having a first released position wherein a part thereof is positioned within said passage and a second operated position wherein a greater part thereof is positioned within said passage, electrical connector means movably supported on said housing and having an actuating arm, said connector means having a projection adapted to enter the recess in the radio device, and contacts thereon adapted to engage the electrical connectors on the device, and cam means on said frame positioned to be engaged by said actuating arm of said connector means, said cam means engaging said actuating arm of said connector means as said housing slides from said first position toward said second position to cause said connector means to slide to a position wherein said projection thereon enters the recess in the device to position the device with respect to said housing, and to cause said contacts on said connector means to engage the electrical connectors on the device.

10. The structure of claim 9 wherein said projection on said electrical connector means has tapered sides to facilitate entry thereof into the recess on the radio device, for accurately positioning the radio device with respect to said housing and holding the same against removal.

11. The structure of claim 9 further including spring means connected to said frame and engaging said housing for moving the same to said first position, and a latch on said frame adapted to engage a portion of said housing to hold said housing in said second position.

12. The structure of claim 11 further including a lock coupled to said latch for holding the same in engagement with said housing to thereby hold said projection of said connector means in the recess of the radio and prevent removal of the radio from said housing.

13. The structure of claim 9 further including spring means coupled to said connector means for biasing the same to a position wherein said projection is removed from said cavity of said housing, with said cam means moving said connector means to a position such that said projection moves into said cavity in said housing.

14. A supporting and connecting structure for electric apparatus which has first and second electrical connectors thereon, including in combination:

a frame having means defining an elongated passage, a housing slidably mounted in said passage of said frame and having a cavity therein for receiving the electric apparatus, said housing having a first unoperated position wherein a part thereof is positioned within said passage and a second operated position wherein a greater part thereof is positioned within said passage, third and fourth electric connector means, each being slidably supported on said housing and having an actuating arm, said third connector means being adapted to couple with the first connector of the apparatus and said fourth connector means being adapted to couple with the second connector of the apparatus, and cam means on said frame having first and second portions positioned to be engaged by said actuating arms of said third and fourth connector means, respectively, said first portion of said cam means engaging said actuating arm of said third connector means as said housing slides from said first position toward said second position to an intermediate position to cause said third connnector means to slide to a position to couple with the first connector, and said second portion of said cam means engaging said actuating arm of said fourth connector means as said housing slides from said intermediate position further toward said second position to cause said fourth connector means to slide to a position to couple with said second connector.

15. The structure of claim 14 wherein said third electrical connector means includes a portion slidable into engagement with the first electrical connector to accurately position the electric apparatus with respect to said housing, said portion including conductors for making electrical connections to the first electrical connector.

16. The structure of claim 15 wherein said fourth electrical connector means includes a conducting pin adapted to be inserted into the second electrical connector, with the positioning of the electrical apparatus in said housing by said third electrical connector means aligning the same for insertion of said conducting pin into the second electrical connector.

17. The structure of claim 16 wherein said housing includes a plurality of support means extending substantially at right angles to the direction of movement of said housing in said frame, said third electrical connector means being mounted on at least one of said support means and said actuator thereof engaging said first cam portion to move said third connector means along said support means, said fourth electrical connector means being mounted on another one of said support means and said actuator thereof engaging said second cam portion to move said fourth connector means along said other support means.

18. The structure of claim 17 further including spring means coupled to said third and fourth electrical connector means for holding said portion of said third electrical connector means and said conducting pin of said fourth electrical connector means clear of said cavity, with said cam means moving said third and fourth connector means so that said portion of said third connector means and said conducting pin of said fourth connector means extend into said cavity.

* * * * *